(12) United States Patent
Sun

(10) Patent No.: US 9,335,461 B2
(45) Date of Patent: May 10, 2016

(54) LIGHT GUIDE PLATE AND FORMING MOULD THEREOF, AND BACKLIGHT MODULE

(71) Applicants: BOE TECHNOLOGY GROUP CO., LTD., Beijing (CN); BOE OPTICAL SCIENCE AND TECHNOLOGY CO., LTD., Suzhou (CN)

(72) Inventor: Hongwei Sun, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 7 days.

(21) Appl. No.: 14/497,410

(22) Filed: Sep. 26, 2014

(65) Prior Publication Data

US 2015/0331175 A1    Nov. 19, 2015

(30) Foreign Application Priority Data

May 16, 2014   (CN) .......................... 2014 1 0208982

(51) Int. Cl.
  *F21V 8/00*    (2006.01)
  *B29C 45/04*   (2006.01)
  *B29D 11/00*   (2006.01)

(52) U.S. Cl.
  CPC .............. *G02B 6/0065* (2013.01); *B29C 45/04* (2013.01); *B29D 11/00663* (2013.01); *G02B 6/0011* (2013.01); *B29C 2045/0466* (2013.01)

(58) Field of Classification Search
  CPC .... G02B 6/0011; G02B 6/0065; B29C 45/04; B29D 11/00663
  See application file for complete search history.

(56) References Cited

U.S. PATENT DOCUMENTS

| | | | | |
|---|---|---|---|---|
| 4,985,809 A | * | 1/1991 | Matsui | ................. G02B 6/0041 362/624 |
| 5,207,493 A | * | 5/1993 | Murase | ................ G02B 6/0043 362/297 |

* cited by examiner

*Primary Examiner* — Thomas M Sember
(74) *Attorney, Agent, or Firm* — Harness, Dickey & Pierce, P.L.C.

(57) ABSTRACT

The present invention relates to the field of display technologies, and in particular, to a light guide plate, a forming mould and a backlight module. The light guide plate comprises a transparent substrate and a light shielding member, wherein the transparent substrate comprises a light outgoing surface, a bottom surface opposite to the light outgoing surface, a light incoming side and a non-light incoming side, and the light shielding member is integrally connected with the non-light incoming side of the transparent substrate. The light at the edge of the light guide plate is shielded by the non-transparent light shielding member, so that the reflection between the light and a plastic frame may be prevented effectively, and the problem may be avoided that light leakage and bright line appear at the edge of the light guide plate.

6 Claims, 5 Drawing Sheets

LIGHT GUIDE PLATE AND FORMING MOULD THEREOF, AND BACKLIGHT MODULE

CROSS-REFERENCE TO RELATED APPLICATION

The present application claims priority to and incorporates by reference the entire contents of Chinese priority document 201410208982.3, filed in China on May 16, 2014.

TECHNICAL FIELD

The present invention relates to the field of display technologies, and in particular, to a light guide plate and a forming mould and a manufacturing method thereof, a backlight module, and a display device.

BACKGROUND

With the development of science and technology, liquid crystal display technologies become more and more mature; and for a TV set, it also changes from the traditional display tube to the current liquid crystal display screen. The liquid crystal display screen is an inactive light-emitting display screen, which does not emit light itself, thus the liquid crystal display screen requires a backlight module to provide a light source. The backlight module has a good colour reducibility, and it is may be easily controlled divisionally, thus it has become the predominant backlight source for a liquid crystal display screen. According to its position in the liquid crystal display screen, the backlight module may further be divided into side-edge type backlight module and direct-type backlight module. Because a light guide plate is used, the side-edge type backlight module may be made ultrathin. As the lightening and thinning of a liquid crystal TV is becoming a main steam in the market today, the side-edge type backlight module for a liquid crystal screen is widely used.

However, the brightness and contrast of a liquid crystal display screen are poor all along. Because that the liquid crystal does not emit light itself and a luminescent tube is required behind a liquid crystal panel to provide a light source, when a poor shielding exists, light leakage may occur, and the contrast and brightness of the liquid crystal display screen will be influenced. For a light guide plate and a plastic frame that do not have a shielding structure, the light outgoing from the side edge of the light guide plate will be reflected by the edge of the plastic frame and emit from the gap between the light guide plate and the plastic frame, which causes a problem that light leakage or bright line appears at the edge of the backlight source module. At present, a light beam emitted from the gap between the light guide plate and the plastic frame is usually shielded by a printed black edge of a diffuser. However, because a gap exists between the diffuser and the plastic frame, it cannot attain the effect that no light is leaked, and the light beam at the edge will still be reflected in the gap, thus light leakage will appear, the light shielding effect will be unapparent, and production cost will be increased.

Therefore, as directed to the above defects, it requires a light guide plate and a forming mould and a manufacturing method thereof, a backlight module, and a display device, which have an apparent light shielding effect, thereby the problem of edge light leakage and edge bright line can be effectively prevented, moreover, the light utilization may be improved, and the production cost may be lowered.

SUMMARY

Technical Problem To Be Solved

The technical problem to be solved by the invention is to provide a light guide plate and a forming mould and a manufacturing method thereof, a backlight module, and a display device. By the light guide plate, the light shielding effect may be apparent, and the situation of edge light leakage and edge bright line can be effectively prevented; moreover, the light utilization may be improved, and the production cost may be lowered.

Technical Solutions

In order to solve the above technical problem, an embodiment of the invention provides a light guide plate, which comprises a transparent substrate and a light shielding member, wherein the transparent substrate comprises a light outgoing surface, a bottom surface opposite to the light outgoing surface, a light incoming side and a non-light incoming side, and the light shielding member is integrally connected with the non-light incoming side of the transparent substrate.

In one example, the light shielding member is a white non-transparent structure.

In one example, the light shielding member is manufactured by injection-moulding a thermoplastic elastomeric material.

In one example, the transparent substrate is manufactured by injection-moulding a polycarbonate material or a polymeric methyl methacrylate material.

In one example, the light shielding member lies on three edges of the transparent substrate.

Another embodiment of the invention provides a forming mould for manufacturing a light guide plate, which comprises a moving half, a fixed half and a pivoted axle, wherein the moving half is slidably mounted on the fixed half via the pivoted axle and can rotate along the circumferential direction of the pivoted axle, a first mould cavity and a second mould cavity are set on the moving half, a bump is set on the fixed half, and the bump may be set corresponding to the first mould cavity and the second mould cavity respectively so as to form a third mould cavity for injection-moulding a light shielding member.

In one example, a first feed channel and a second feed channel are set on the fixed half, the first feed channel is used for feeding a material required for manufacturing a light shielding member, and the second feed channel is used for feeding a material required for manufacturing a transparent substrate.

In one example, the first feed channel is used for feeding a molten white material, and the second feed channel is used for feeding a molten transparent material.

Another embodiment of the invention provides a method for manufacturing a light guide plate, which comprises the steps of:

S1: mounting the above forming mould on an injection moulding machine;

S2: feeding a material required for manufacturing a light shielding member into a third mould cavity formed between a bump and a first mould cavity after clamping a moving half and a fixed half;

S3: after unclamping the moving half and the fixed half, rotating the moving half by 180° and then clamping the moving half and the fixed half again;

S4: feeding a material required for manufacturing a transparent substrate into the first mould cavity; and at the same time, feeding the material required for manufacturing the light shielding member into a third mould cavity formed between the bump and a second mould cavity;

S5: cooling, then unclamping the moving half and the fixed half and pushing out a finished product of the light guide plate in the first mould cavity after; rotating the moving half by 180° and then clamping the moving half and the fixed half again;

S6: feeding the material required for manufacturing the transparent substrate into the second mould cavity; and at the same time, feeding the material required for manufacturing the light shielding member into the third mould cavity formed between the bump and the first mould cavity; and S7: cooling, then unclamping the moving half and the fixed half and pushing out a finished product of the light guide plate in the second mould cavity; rotating the moving half by 180° and then clamping the moving half and the fixed half again.

In one example, the material required for manufacturing a light shielding member is a thermoplastic elastomeric material.

In one example, the material required for manufacturing the transparent substrate is a polycarbonate material or a polymethyl methacrylate material.

Another embodiment of the invention provides a backlight module, which comprises the above light guide plate.

The invention provides a display device, which comprises the above light guide plate or the above backlight module.

Beneficial Effects

The above technical solutions of the invention have the following beneficial effects: the light guide plate according to the invention includes a transparent substrate and a light shielding member, wherein the transparent substrate includes a light outgoing surface, a bottom surface opposite to the light outgoing surface, a light incoming side and a non-light incoming side, and the light shielding member is integrally connected with the non-light incoming side of the transparent substrate. The light at the edge of the light guide plate is shielded by the non-transparent light shielding member, so that the reflection between the light and a plastic frame may be prevented effectively, and the problem may be avoided that light leakage and bright line appear at the edge of the light guide plate. In comparison with the prior art in which printed black edges are added to a diffuser, the light guide plate has a better effect in light shielding, the light at the edge may be totally shielded without leakage, and the light shielding effect may be apparent.

LIST OF REFERENCE MARKS

1: Transparent Substrate
2: Light shielding member
3: Moving Half
4: Fixed Half
5: Pivoted Axle
6: First Feed Channel
7: Second Feed Channel
31: First Mould cavity
32: Second Mould cavity
33: Third Mould cavity
41: Bump

DETAILED DESCRIPTION

The implementation modes of the invention will be further described in detail below in conjunction with the drawings and embodiments. The following embodiments are used for illustrating the invention, rather than limiting the scope of the invention.

In the description of the invention, unless illustrated otherwise, "a plurality of" refers to two or more; unless illustrated otherwise, "notched shape" refers to a shape except for a flush section. The orientation or position relation indicated by terms "above", "under", "left", "right", "in", "out", "front end", "rear end", "head" and "end" refers to an orientation or position relation shown by the drawings, which is only used for easily and plainly describing the invention, rather than indicating or suggesting that the device or element in question must has the specified orientation or be constructed and operated in the specified orientation; therefore, it cannot be construed as a limit to the invention. Additionally, the terms "first", "second" and "third", etc., are only used for the purpose of description, rather than indicating or suggesting the relative importance.

It should be noted that, in the description of the invention, unless otherwise specified and limited, terms "amount", "joint" and "connected" should be understood in their broad sense, for example, it may be fixed connection, or detachable connection, or integral connection; it may be mechanical connection, or electrical connection; and it may be direct connection, or indirect connection via an intermediate medium. For one of ordinary skills in the art, the specific meaning of the above terms in the invention may be understood according to specific situations.

Figure 1:
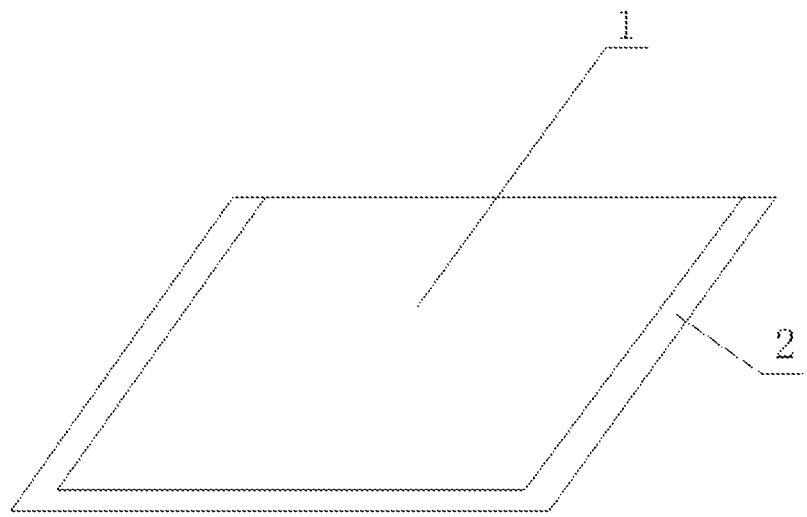
FIG. 1 is a structural representation of a light guide plate according to one embodiment of the invention.

As shown in FIG. 1, one embodiment of the invention provides a light guide plate, which includes a transparent substrate 1 and a light shielding member 2, wherein the transparent substrate 1 includes a light outgoing surface, a bottom surface opposite to the light outgoing surface, a light incoming side and a non-light incoming side; the light shielding member 2 is made of a non-transparent material, and it is integrally connected with the non-light incoming side of the transparent substrate 1. The light at the edge of the transparent substrate 1 is shielded by the non-transparent light shielding member, thus the reflection between the light and the plastic frame may be prevented, and the problem of edge light leakage may be avoided. In comparison with the existing mode in which a printed black edge is added to a diffuser, the light guide plate of the invention has a better effect in light shielding. It may be understood that, a gap usually exists between the diffuser and the plastic frame, thus the light beam cannot be totally shielded. However, in the invention, the light beam leaked from the edge of the light guide plate may be shielded more thoroughly, and the light shielding effect will be better.

Typically, the light shielding member 2 is a white non-transparent structure and is made by injection-moulding a white material, and the light shielding member 2 is injection-moulded on three edges of the transparent substrate 1, so that the light utilization efficiency may be effectively improved. Because the light at the edge of the transparent substrate 1 may be reflected by the white material and reused, and return to the transparent substrate 1, so that the light utilization of the effective luminescent area may be improved.

On the basis that the light shielding member 2 is a non-transparent structure, the implementation modes in which the light shielding member 2 is injection-moulded by a material of other colors (for example, a black material) all pertain to the protection scope of the invention. In order to lower the production cost, improve the light utilization and improve the joint efficiency with the transparent substrate 1, typically, the light shielding member 2 is manufactured by injection-moulding a TPE (Thermoplastic Elastomer) material, which may be the TA-T series or the TA-F series of the TPE material (Dongguan Subo Rubber & Plastics Co., Ltd). The two series of TPE materials both are off white, and the light shielding effect is apparent.

Typically, the transparent substrate 1 is made of a transparent material, and the transparent material may be a PC (Polycarbonate) material or a PMMA (polymeric methyl methacrylate) material.

One embodiment of the invention provides a backlight module, which includes the light guide plate.

One embodiment of the invention provides a display device, which includes a light guide plate or a backlight module.

Figure 2:
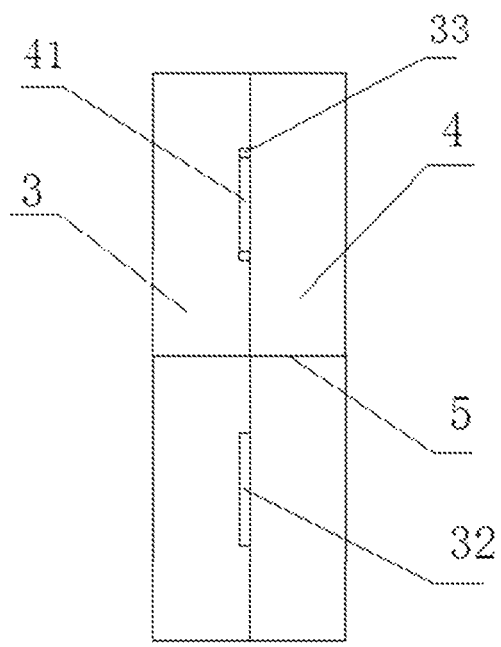
FIG. 2 is a structural representation of a forming mould for manufacturing a light guide plate according to one embodiment of the invention.
Figure 3:
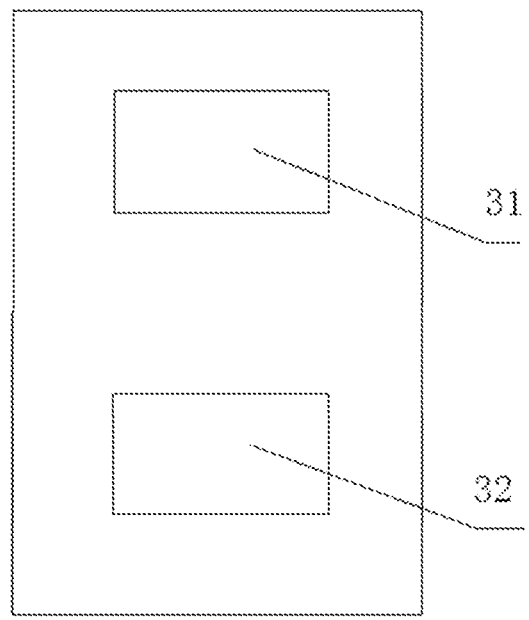
FIG. 3 is a structural representation of a moving half according to one embodiment of the invention.
Figure 4:
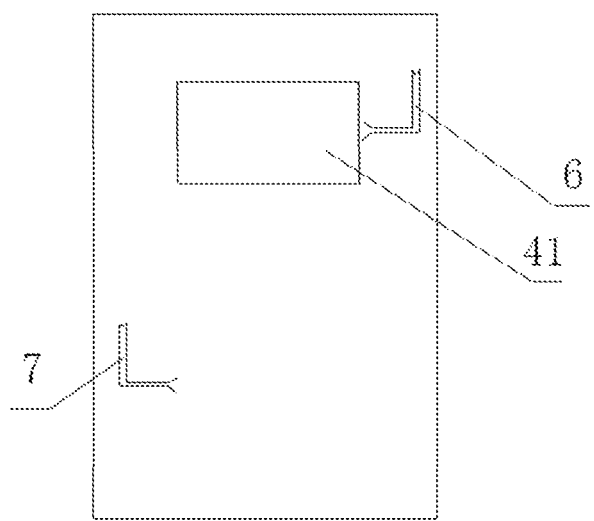
FIG. 4 is a structural representation of a fixed half according to one embodiment of the invention.

As shown in FIG. 2-FIG. 4, one embodiment of the invention further provides a forming mould for manufacturing a light guide plate, which includes a moving half 3, a fixed half 4 and a pivoted axle 5. The moving half 3 is slidably mounted on the fixed half 4 via a pivoted axle 5 and can rotate along the circumferential direction of the pivoted axle 5. a first mould cavity 31 and a second mould cavity 32 are set on the moving half 3, and a bump 41 is set on the fixed half 4, the bump 41 may be set corresponding to the first mould cavity 31 and the second mould cavity 32 respectively to form a third mould cavity 33 for injection-moulding the light shielding member 2.

The first mould cavity 31 and the second mould cavity 32 are set symmetrically relative to the pivoted axle 5, and the first mould cavity 31 and the second mould cavity 32 have the same shape. By rotating the pivoted axle 5, a third mould cavity 33 for injection-moulding the light shielding member 2 may be formed between the bump 41 and the first mould cavity 31, and a third mould cavity 33 for injection-moulding the light shielding member 2 may also be formed between the bump 41 and the second mould cavity 32.

A first feed channel 6 and a second feed channel 7 are set on the fixed half 4, wherein the first feed channel 6 is used for feeding a material required for manufacturing the light shielding member, and the second feed channel 7 is used for feeding a material required for manufacturing a transparent substrate.

Typically, the first feed channel 6 is used for feeding a molten white material, and the second mould cavity 32 is used for feeding a molten transparent material.

Double-colour injection moulding may be implemented by using the forming mould, and the network node region of the light guide plate is located on the inner side of the double-colour binding part, thus the effective luminescent area of the light guide plate will not be influenced. Moreover, the precision of injection moulding may be guaranteed by using the forming mould, and precise injection moulding may be attained, thus products meet a criterion may be produced.

Figure 5:
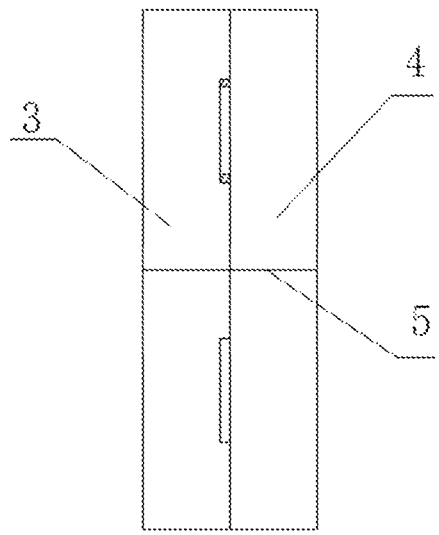
FIG. 5 is a schematic diagram showing a clamping state in the Step S2 of a method for manufacturing a light guide plate according to one embodiment of the invention.
Figure 6:
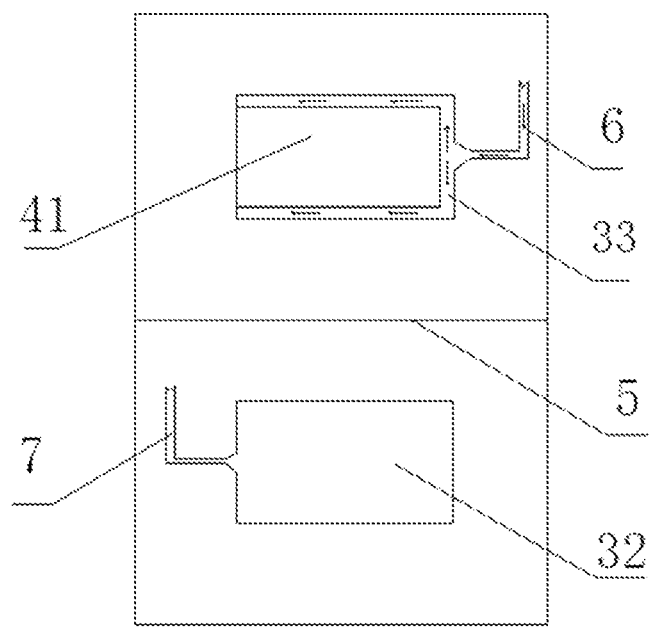
FIG. 6 is a schematic diagram showing the state of the first mould cavity in Step S2 of a method for manufacturing a light guide plate according to one embodiment of the invention.

As shown in FIG. 5-FIG. 10, a method for manufacturing a light guide plate include the steps of:

S1: mounting the above forming mould on an injection moulding machine;

S2: feeding a material required for manufacturing a light shielding member into a third mould cavity formed between a bump and a first mould cavity after clamping a moving half and a fixed half;

Specifically, first of all, as shown in FIG. 5, the moving half 3 is clamped with the fixed half 4 by sliding along the axial direction of the pivoted axle 5, the first mould cavity 31 is located above the pivoted axle 5, and a third mould cavity 33 formed between a bump 41 and a first mould cavity 31; the second mould cavity 32 is located under the pivoted axle 5. Then, as shown in FIG. 6, it starts to feed a molten-state white material required for manufacturing the light shielding member into the third mould cavity 33 via the first feed channel 6. It may be understood that, the injection moulding machine may be set with double jet nozzles that are in communication with the first feed channel and the second feed channel respectively, for providing an injection-moulding material to the first feed channel and the second feed channel, or it is possible to provide injection-moulding materials to the first feed channel and the second feed channel respectively, which is not limited here. The first feed channel is used for inducting a molten-state white material, and the second feed channel is used for inducting a molten-state transparent material. The white material may be manufactured by injection-moulding a TPE material, for example, the TA-T series or the TA-F series of TPE material.

Figure 7:
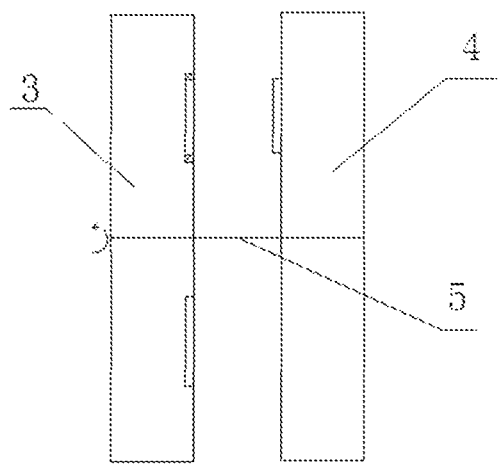
FIG. 7 is a schematic diagram showing the unclamping state in Step S3 of the method for manufacturing a light guide plate according to one embodiment of the invention.
Figure 8:
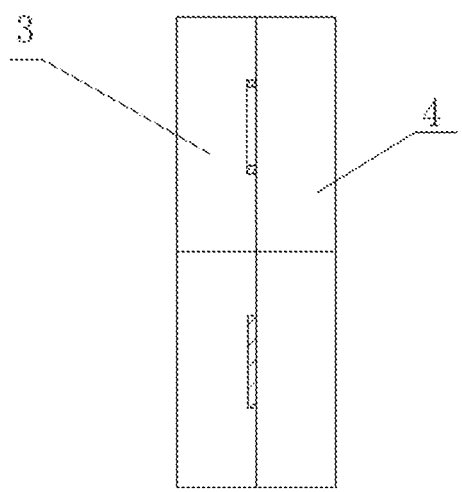
FIG. 8 is a schematic diagram showing a clamping state after the moving half is rotated in Step S3 of the method for manufacturing a light guide plate according to one embodiment of the invention.

S3: after unclamping the moving half and the fixed half, rotating the moving half by 180° and then clamping the moving half and the fixed half again;

Specifically, after injection-moulding the white material, the moving half 3 and the fixed half 4 are unclamped, as shown in FIG. 7; the moving half 3 slides along the axial direction of the pivoted axle 5 to be separated from the fixed half 4; and then, after the moving half 3 rotates by 180° along the circumferential direction of the pivoted axle 5, as shown in FIG. 8, the moving half 3 again slides along the axial direction of the pivoted axle 5 to clamp with the fixed half 4. At this point, the first mould cavity 31 into which a white material has been fed is located under the pivoted axle 5, and the second mould cavity 32 is located above the pivoted axle 5, and a third mould cavity 33 is formed between the bump 41 and the second mould cavity 32.

Figure 9:
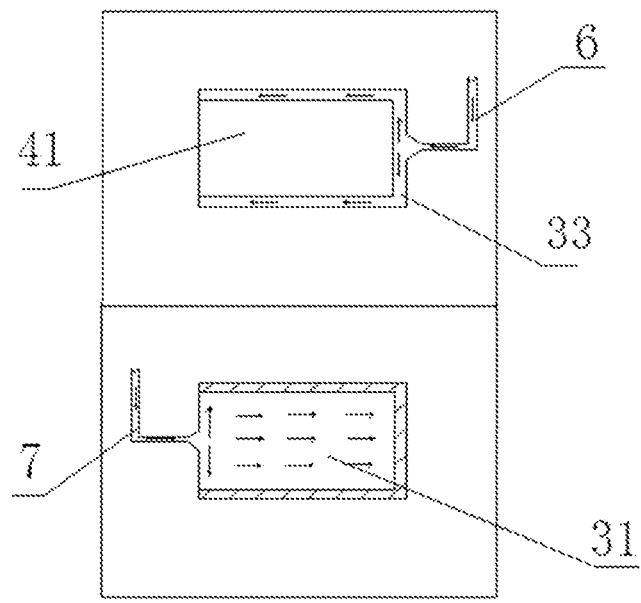
FIG. 9 is a schematic diagram showing the state of the first mould cavity and the second mould cavity in Step S4 of the method for manufacturing a light guide plate according to one embodiment of the invention.

S4: feeding a material required for manufacturing a transparent substrate into the first mould cavity; and at the same time, feeding the material required for manufacturing the light shielding member into a third mould cavity formed between the bump and a second mould cavity;

Specifically, as shown in FIG. 9, a transparent material required for manufacturing a transparent substrate is fed into the first mould cavity 31 where a white material has been fed, via the second feed channel 7. The transparent material may be a PC material or a PMMA material. At the same time, a molten-state white material required for manufacturing the light shielding member is fed into the third mould cavity 33 formed between the bump 41 and the second mould cavity 32, via the first feed channel 6.

Figure 10:
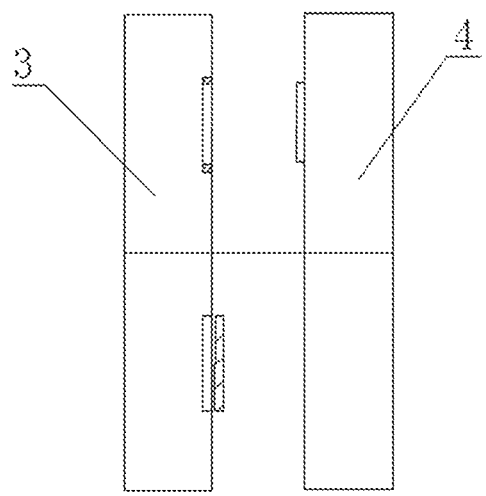
FIG. 10 is a schematic diagram showing the state in Step S5 of the method for manufacturing a light guide plate according to one embodiment of the invention.

S5: cooling, then unclamping the moving half and the fixed half and pushing out a finished product of the light guide plate in the first mould cavity; rotating the moving half by 180° and then clamping the moving half and the fixed half again;

Specifically, as shown in FIG. 10, after cooling, the white material and the transparent material in the first mould cavity 31 combine into an integral structure; the moving half 3 slides along the axial direction of the pivoted axle 5 to be separated from the fixed half 4, and a finished product of the light guide plate in the first mould cavity 31 is pushed out. Then, after the moving half 3 rotating by 180° along the circumferential direction of the pivoted axle 5, the moving half 3 again slides along the axial direction of the pivoted axle 5 to clamp with the fixed half 4.

S6: feeding the material required for manufacturing the transparent substrate into the second mould cavity; and at the same time, feeding the material required for manufacturing the light shielding member into the third mould cavity formed between the bump and the first mould cavity;

Specifically, a molten-state transparent material required for manufacturing a transparent substrate is fed into the second mould cavity where the white material has been fed, via the second feed channel; at the same time, a molten-state white material required for manufacturing the light shielding member is fed into a third mould cavity formed between a bump and a first mould cavity, via the first feed channel.

S7: cooling, then unclamping the moving half and the fixed half and pushing out a finished product of the light guide plate in the second mould cavity; and rotating the moving half by 180° and then clamping the moving half and the fixed half again.

To attain an object of continuous production, Step S1-S7 are repeated, and injection moulding is performed on the first mould cavity and the second mould cavity for multiple times.

Clamping and unclamping are repeated for multiple times to injection-mould in the first mould cavity and the second mould cavity for multiple times, so that when a secondary injection-moulding the light guide plate is required, the light guide plate can still be produced continuously, and the production cycle can be shortened. It should be noted that, clamping is a process in which the moving half slides along the axial direction of the pivoted axle to be clamped with the fixed half, and unclamping is process in which the moving half slides along the axial direction of the pivoted axle to be separated from the fixed half. As a result, in the invention, the work efficiency may be improved, non-intermittent work may be realized, and the production capacity may be increased.

In conclusion, the light guide plate according to the invention includes a transparent substrate and a light shielding member, wherein the transparent substrate includes a light outgoing surface, a bottom surface opposite to the light outgoing surface, a light incoming side and a non-light incoming side, and the light shielding member is integrally connected with the non-light incoming side of the transparent substrate. The light at the edge of the light guide plate is shielded by the non-transparent light shielding member, so that the reflection between the light and a plastic frame may be prevented effectively, and the problem may be avoided that light leakage and bright line appear at the edge of the light guide plate. In comparison with the prior art in which printed black edges are added to a diffuser, the light guide plate has a better effect in light shielding, the light at the edge may be totally shielded without leakage, and the light shielding effect may be apparent. Moreover, because the light shielding member of the light guide plate may be made of a white opaque material, the light at the edge may be reflected and reused, and return to the transparent substrate, so that the light utilization efficiency may be improved.

The above embodiments of the invention are used for illustrating and describing the invention, rather than exhausting the embodiments of the invention or limiting the invention thereto. Various modifications and variations are apparent to one of ordinary skills in the art. The above embodiments are selected and described to better illustrating the theories and practical applications of the invention and to make one of ordinary skills in the art better understand the invention so as to make various embodiments with various modifications for specific purposes.

What is claimed is:

1. A forming mould for manufacturing a light guide plate, wherein the light guide plate comprises a transparent substrate and a light shielding member, the transparent substrate comprises a light outgoing surface, a bottom surface opposite to the light outgoing surface, a light incoming side and a non-light incoming side, and the light shielding member is integrally connected with the non-light incoming side of the transparent substrate, and the forming mould comprises a moving half, a fixed half and a pivoted axle, wherein the moving half is slidably mounted on the fixed half via the pivoted axle and is rotatable along a circumferential direction of the pivoted axle, a first mould cavity and a second mould cavity are set on the moving half, a bump is set on the fixed half, and the bump is set to correspond to the first mould cavity and the second mould cavity so as to form a third mould cavity for injection-moulding the light shielding member.

2. The forming mould according to claim 1, wherein a first feed channel and a second feed channel are set on the fixed half, wherein the first feed channel is used for feeding a material required for manufacturing the light shielding member, and the second feed channel is used for feeding a material required for manufacturing a transparent substrate.

3. The forming mould according to claim 2, wherein the first feed channel is used for feeding a molten white material, and the second feed channel is used for feeding a molten transparent material.

4. A method for manufacturing a light guide plate by using the forming mould according to claim 1, the method comprising the steps of:

mounting the forming mould on an injection molding machine;

clamping the moving half to the fixed half, then feeding a material required for manufacturing a light shielding member into the third mould cavity;

unclamping the moving half from the fixed half, then rotating the moving half by 180° and then clamping the moving half and the fixed half again;

feeding a material required for manufacturing a transparent substrate into the first mould cavity; and at the same time, feeding the material required for manufacturing the light shielding member into the third mould cavity;

cooling the forming mould, then unclamping the moving half from the fixed half and then pushing out a finished product of the light guide plate from the first mould cavity, then rotating the moving half by 180° and then clamping the moving half and the fixed half again;

feeding the material required for manufacturing the transparent substrate into the second mould cavity, and at the same time, feeding the material required for manufacturing the light shielding member into the third mould cavity; and cooling the forming mould, then unclamping the moving half from the fixed half and then pushing out a finished product of the light guide plate in the second mould cavity, then rotating the moving half by 180° and then clamping the moving half and the fixed half again.

5. The method according to claim 4, wherein the light shielding member is manufactured by injection-moulding a thermoplastic elastomeric material.

6. The method according to claim 4, wherein the transparent substrate is manufactured by injection-moulding a polycarbonate material or a polymeric methyl methacrylate material.

* * * * *